United States Patent
Galbiati et al.

[19]

[11] Patent Number: 6,057,663
[45] Date of Patent: May 2, 2000

[54] CURRENT CONTROL IN DRIVING DC-BRUSHLESS MOTOR WITH INDEPENDENT WINDINGS

[75] Inventors: Ezio Galbiati, Agnadello; Michele Boscolo, Sottomarina; Luca Bertolini, Milan, all of Italy

[73] Assignee: STMicroelectronics S.r.l., Agrate Brianza, Italy

[21] Appl. No.: 09/131,249

[22] Filed: Aug. 5, 1998

[30] Foreign Application Priority Data

Aug. 8, 1997 [EP] European Pat. Off. ............ 97830420

[51] Int. Cl.[7] .................................................. G05B 11/28
[52] U.S. Cl. ........................ 318/599; 318/701; 318/254; 318/696; 388/804
[58] Field of Search ...................... 318/701, 254, 318/599, 696, 685, 439, 138; 388/804, 811, 819, 829

[56] References Cited

U.S. PATENT DOCUMENTS

| | | | |
|---|---|---|---|
| 5,442,538 | 8/1995 | Ikeda et al. | 363/95 |
| 5,656,910 | 8/1997 | Erckert | 318/685 |
| 5,739,662 | 4/1998 | Li | 318/701 |

*Primary Examiner*—Brian Sircus
*Attorney, Agent, or Firm*—Theodore E. Galanthay; Allen, Dyer, Doppelt, Milbrath & Gilchrist, P.A.

[57] ABSTRACT

The control of the current in a PWM mode through independently controlled windings of a multi-phase motor driven in a "bipolar" mode is implemented by employing only two sense resistors and related control loops. This is so regardless of the actual number of windings of the motor.

10 Claims, 7 Drawing Sheets

CURRENT CONTROL IN DRIVING DC-BRUSHLESS MOTOR WITH INDEPENDENT WINDINGS

FIELD OF THE INVENTION

The present invention relates to motor control, and, more particularly, to techniques for driving high speed electronically switched DC motors, commonly referred to as "brushless" motors.

BACKGROUND OF THE INVENTION

Electronically switched DC motors are used in many control and regulation applications. Such motors are also used in peripherals, such as mass memory drive systems like hard disks, floppy disks, optical disks and CD-ROM drives, as well as in tape drives and the like, all generally requiring ever increasing speeds. Although these systems may be easily designed for high speed, the inductive character of the electrical load represented by the phase windings of the motor, the inertial characteristics of the rotor and of the rotating mass, pose limitations and create technological problems for the realization of motors capable of being correctly controlled at ever increasing speeds.

Despite the fact that electronically switched systems for brushless DC motors may be designed for a higher number of phase windings, it is quite common for a brushless motor to have three phase windings connected in a star configuration and defining six different switching phases and P number of poles. In this case, there will be a number 3*P of equilibrium points in a complete revolution of the rotor.

In the present description, each excitation phase will be indicated according to a standard notation by two capital letters. The first capital letter (for example, A, B or C) defines the winding through which the current conventionally flows from the respective supply terminal towards the star center (CT). The second capital letter, preceded by the sign (\), designates the winding through which the current, conventionally coming from the star center (CT), flows toward the supply terminal of the relative winding.

These brushless motors are commonly driven by an integrated circuit whose output stage is represented by a polyphase full-wave bridge circuit, which in the case of a three-phase motor may employ six bipolar (BJT) or power field effect transistors (MOS). Commonly, the motor current is linearly controlled through a transconductance loop or in a PWM mode as shown in the scheme of FIG. 1. During a certain switching phase of the motor, the "sourcing" power transistor is forced into full conduction (that is to saturation in case of an MOS device) whereas the "sinking" power transistor operates as a transconductance element.

The techniques of electronically switching DC motors permit control of the rotation according to different modes. Some of these control modes are described in the European patent applications No. 96830440.2, filed on Aug. 1, 1996, No. 96830295.0, filed on May 22, 1996, No. 96830190.3, filed on Apr. 4, 1996 and No. 96830180.4 filed on Mar. 29, 1996, assigned to the present assignee.

During each switching phase, regardless of the fact that a voltage or current control mode is implemented, the driving of the motor windings may involve either a constant or varying current. The case of a three-winding DC motor, driven with a constant current during each phase, implies the excitation of two windings during each switching phase, while a third winding remains unexcited. This driving scheme whereby at any instant the current flows only in two windings out of three is often referred to as "bipolar".

By referring to A, B and C the three winding terminals and by calling AB\ the supply between phase A and phase B with the A potential greater than the B potential, the required sequence for obtaining a rotation is:

AB\-AC\-BC\-BA\-CA\-CB\

When the motor must rotate in the opposite direction it is sufficient to invert the direction of the above sequence.

For an efficient driving of the motor, the phase switching instant must be synchronized with the instantaneous rotor's position. This type of driving is known as "bipolar" because two phase windings are exited at each instant, and in case of a motor connected in a star configuration, permits controlling the current in the winding by using, as mentioned, a single sensing resistor in electrical series with the common source of the three half-bridges. Indeed, the phases (windings) that at any instant are crossed by the driving current are connected in series. Therefore, only a single control of the current that crosses both windings and also the sensing resistor is required.

The voltage produced by the current on the terminals of the sensing resistor is used as a feedback by the current control circuit. The current control circuit may be of the linear type, controlling for instance the saturation voltage transistors of the lower MOS of the half-bridge, or of the PWM type, switching off for a certain period, for example, the upper MOS transistors or the half-bridges.

Differently from a motor connected in a star configuration, the motor with independent windings whose driving scheme is shown in FIG. 2, does not have windings connected in series. Therefore, to implement a current control for such a system, all the lower half-bridge branches could be connected to ground through a sensing resistor, as shown in FIG. 3. By doing so, the total current, circulating in the motor windings could be controlled through the addition of the currents relative to the distinct windings. However, because of the generated back electromotive force, the current in the single winding will be modulated by the back electromotive force.

FIG. 4 shows the current through a motor winding for the type of current control as described above. With this type of control there is an inevitable loss of efficiency because the back electromotive force limits the current at the instants of maximum torque generation.

Another approach is that of controlling the current individually for each phase winding, and FIG. 5 shows the scheme of a brushless motor with independent windings where the driving is effected through three full-bridges, each of which drives a motor's winding. This requires, of course, a multiplication of the current control loops by the number of the windings.

SUMMARY OF THE INVENTION

The present invention provides a PWM mode current control of a brushless motor with independent phase windings, driven in a bipolar mode. Moreover, the current is separately controlled for each winding while using only two sensing resistors and only two control loops, regardless of the actual number of phase windings.

The method of the invention comprises the following steps:

sensing the current that flows through a first phase winding on a first sensing resistor connected between the lower potential nodes connected in common with one of the two half-bridge stages of the full-bridges and a common ground node of the circuit and sensing the current that flows through a second phase winding on a second sensing resistor connected between the lower potential nodes connected in common of the other half-bridge stages of the full-bridge stages and the common ground node of the circuit;

comparing the signals on the first sensing resistor and on the second sensing resistor with a same reference signal, generating logic triggering signals for two monostable circuits, respectively; and driving each of the half-bridges through a combinatory logic gate combining the signal produced by a respective one of the two monostable circuits with a driving signal produced by a sequencing and synchronizing system of the phase switchings.

The combinatory logic gate may be of the OR or AND type, depending upon the manner in which current recirculation is organized through the upper or lower portions of the full-bridges. In either case, the invention permits implementing a PWM current mode control, while limiting the number of necessary regulation loops and current sensing resistors, regardless of the number of phase windings to be independently driven.

BRIEF DESCRIPTION OF THE DRAWING

The various aspects and advantages of the invention will become even clearer through the following description of several embodiments and by referring to the attached drawings, wherein.

DETAILED DESCRIPTION OF THE PREFERRED EMBODIMENTS

Figure 1:
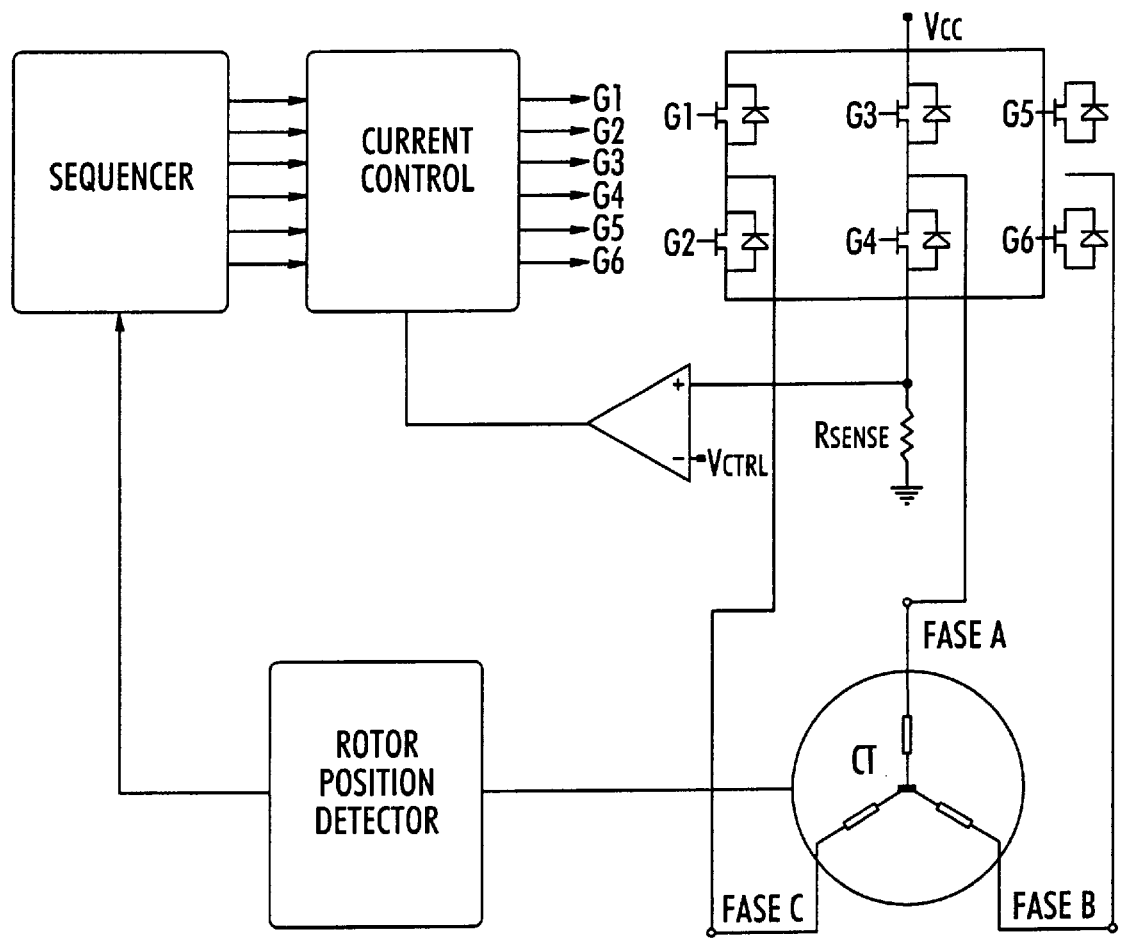
FIG. 1 shows the block diagram of a system for driving brushless motors with three phase windings connected in a star configuration, using a single sensing resistor as in the prior art.
Figure 2:
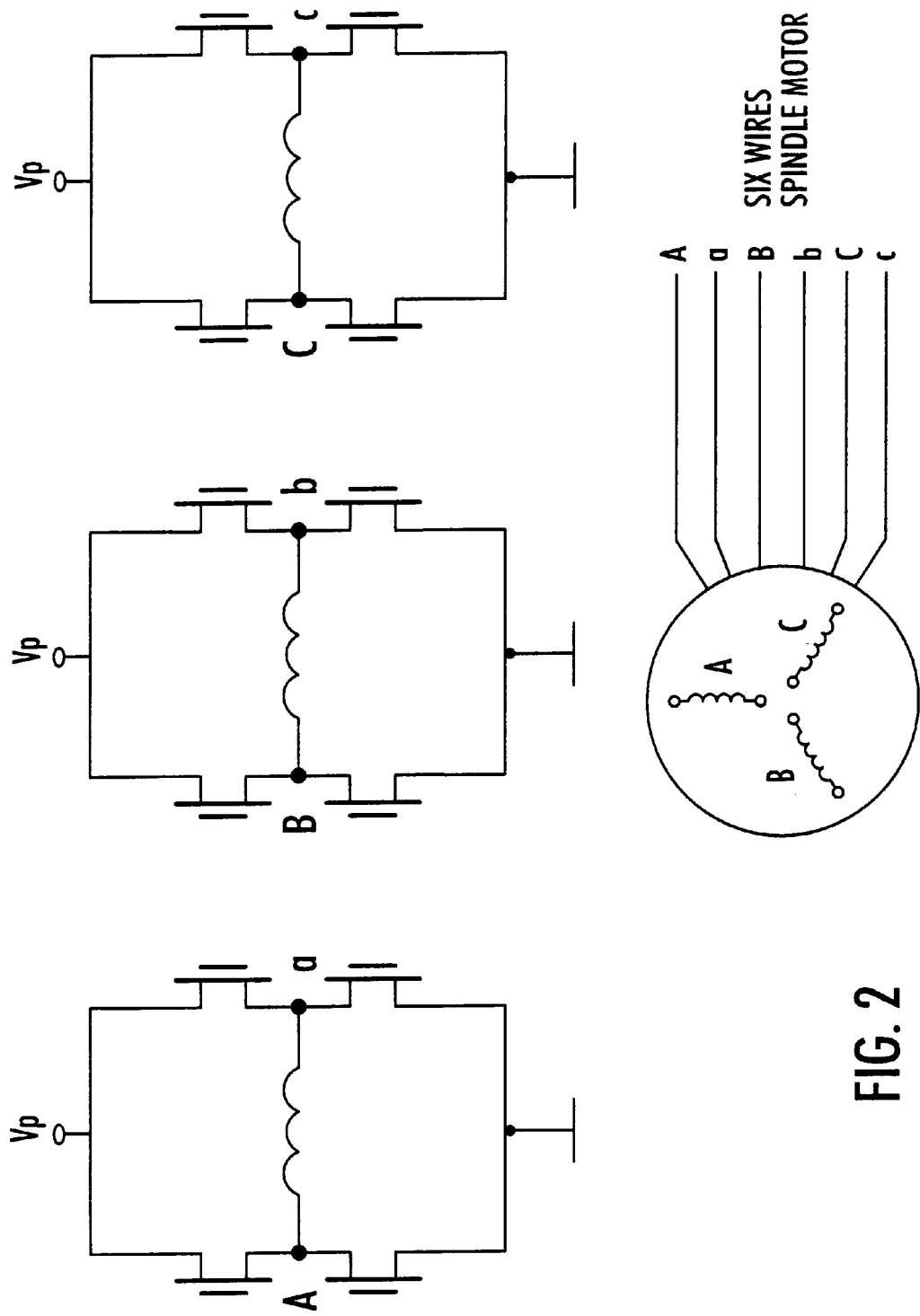
FIG. 2 shows a brushless motor having the stator's windings completely independent from each other, and a relative output stage composed of three full-bridge stages that drive independently the three motor's windings as in the prior art.
Figure 3:
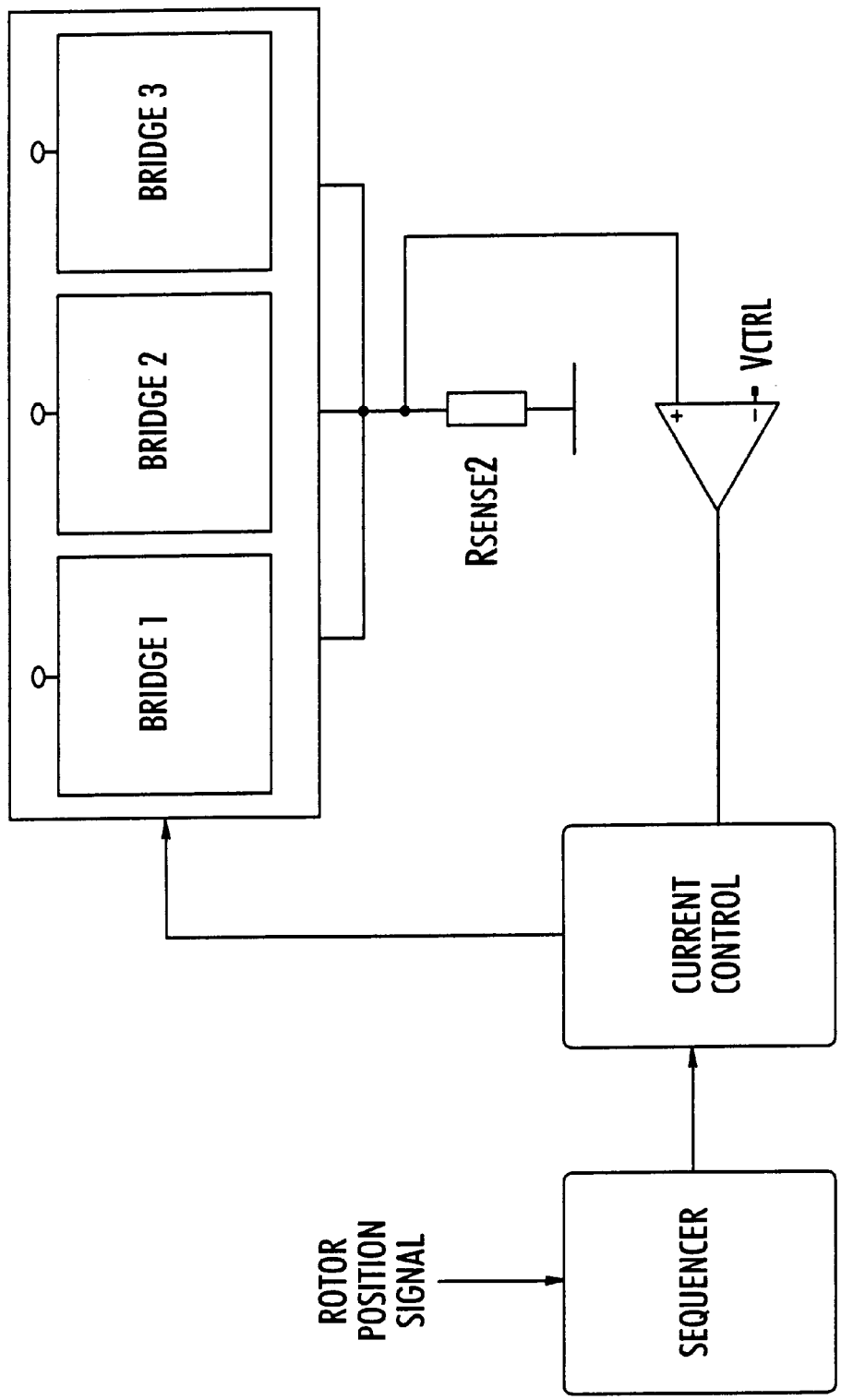
FIG. 3 shows how the control of the current may be implemented in a brushless motor with independent windings of FIG. 2, using only one sensing resistor for the current control of a motor's winding as in the prior art.
Figure 4:
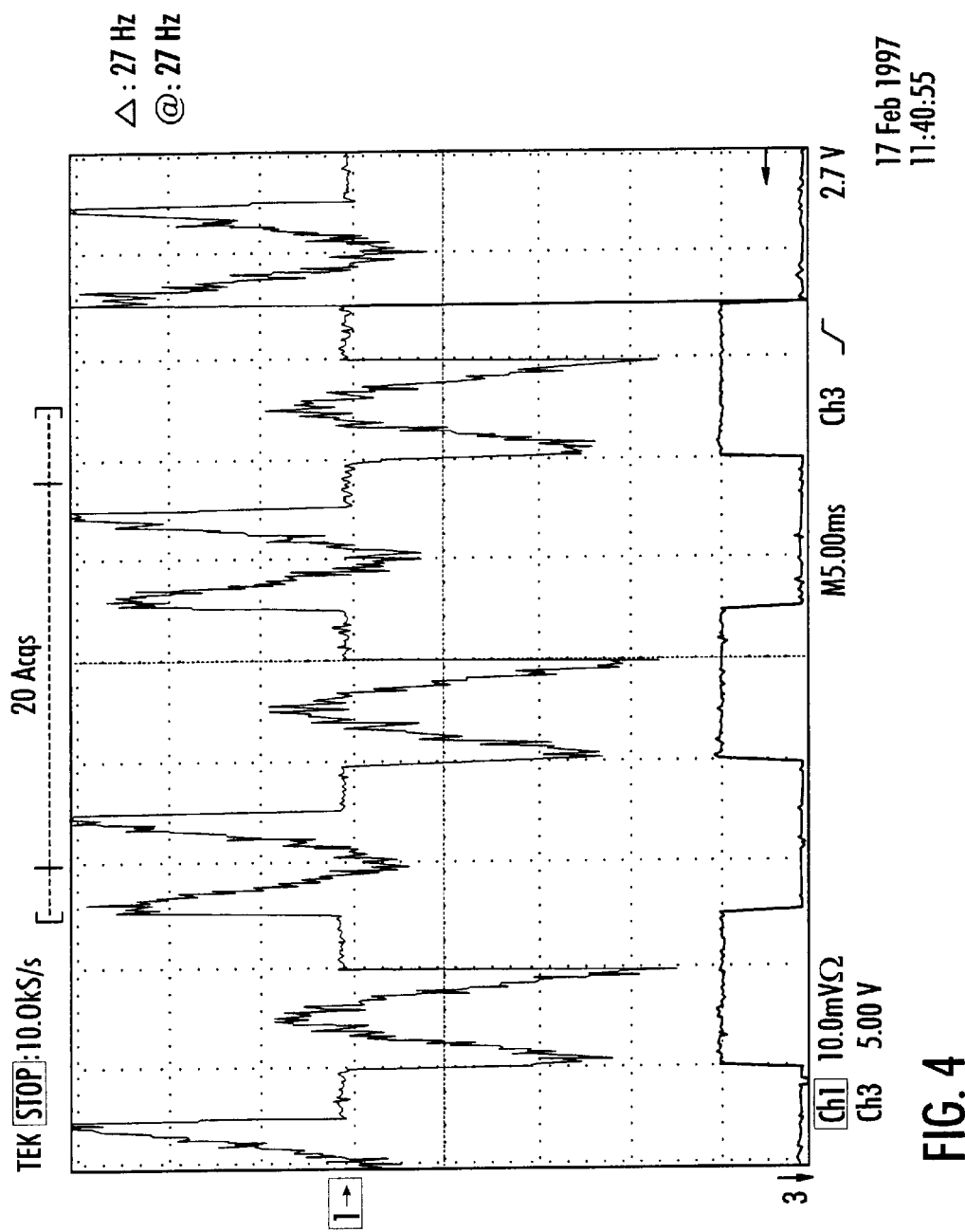
FIG. 4 shows the waveform of the current in a winding of the motor according to a prior art current control system as the one represented in FIG. 3.
Figure 5:
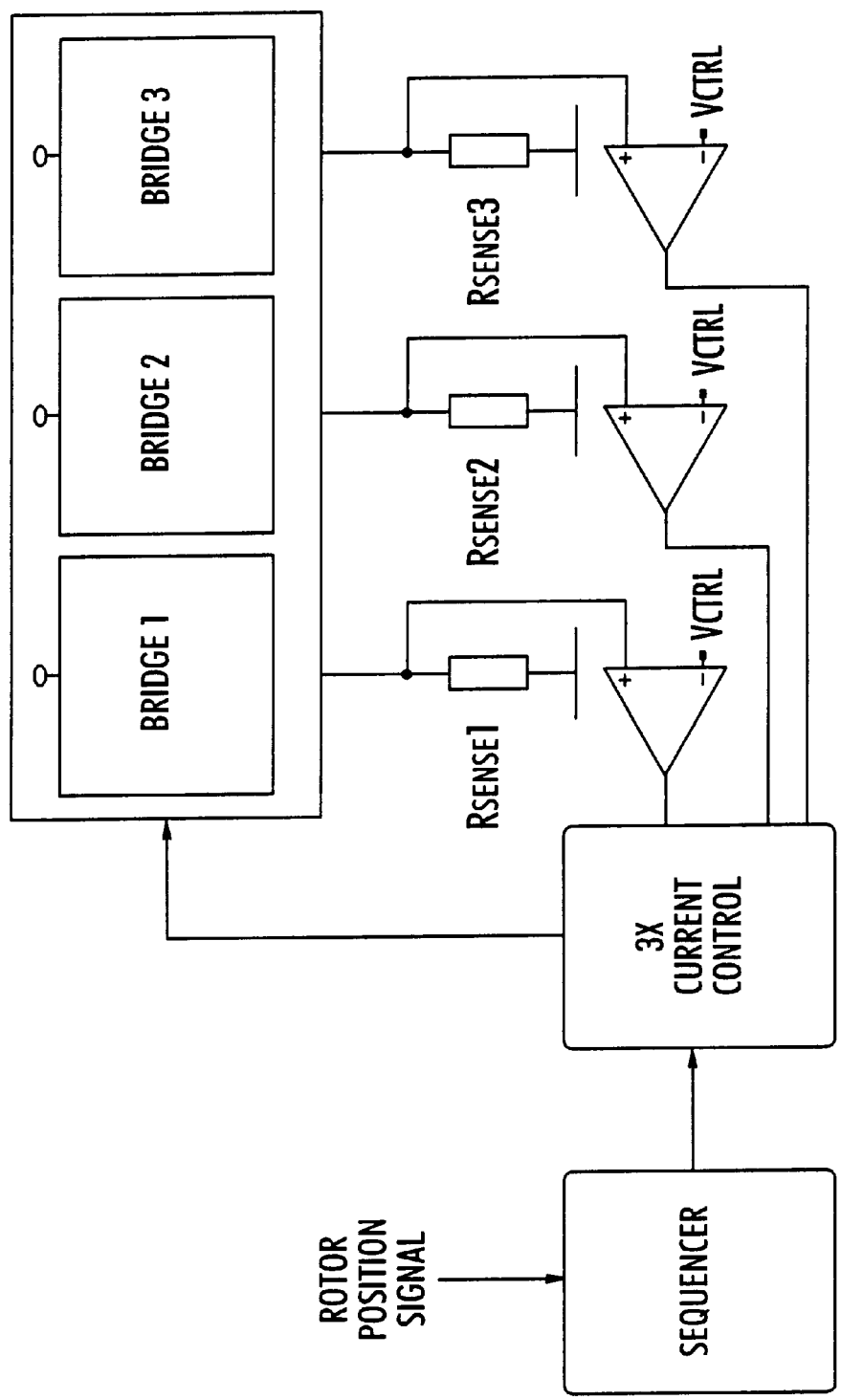
FIG. 5 shows an alternative scheme of a system to control individually the currents in a brushless motor with independent windings as in the prior art.
Figure 6:
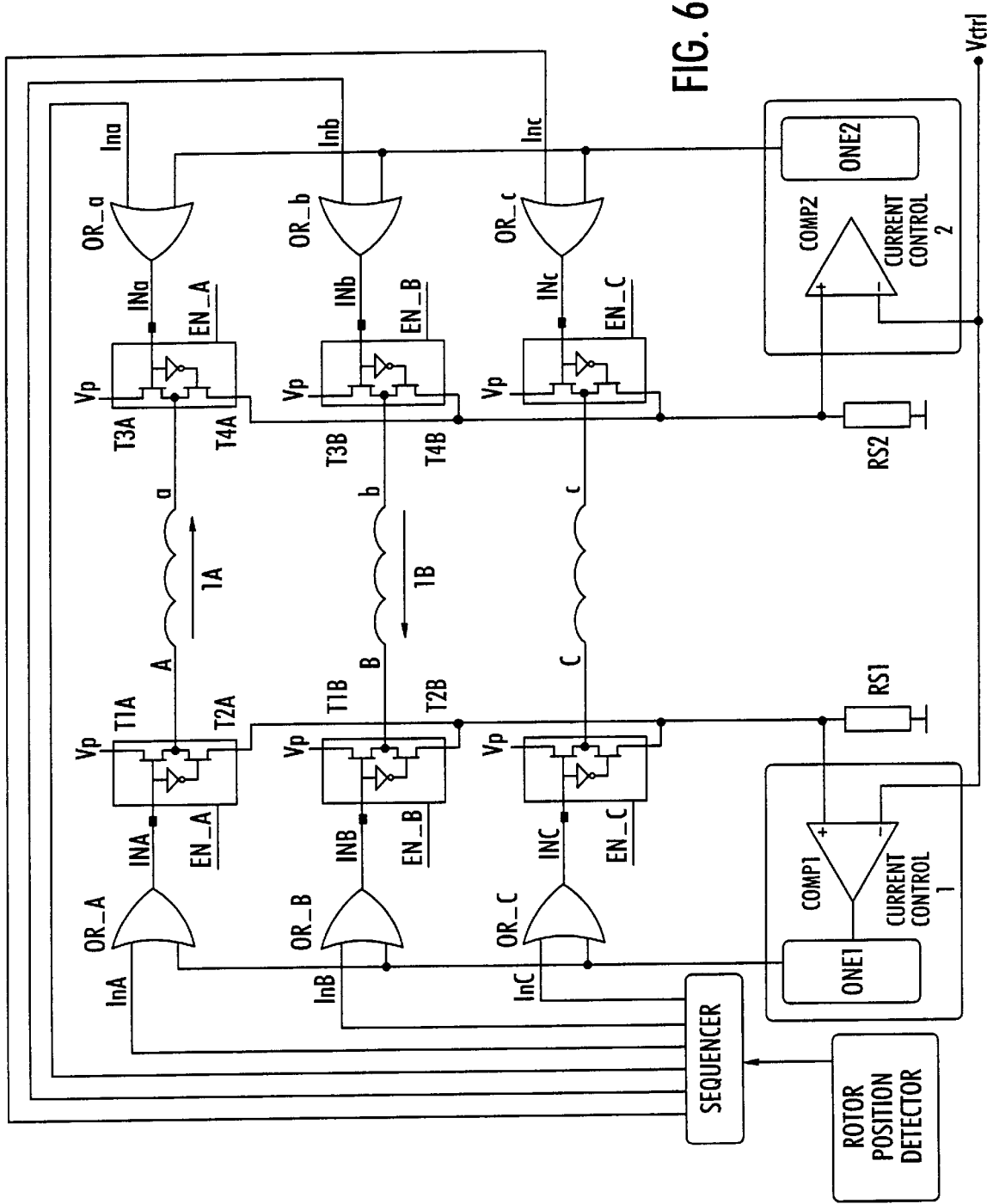
FIG. 6 is a block diagram of a control system realized according to the present invention for a brushless motor with independent windings driven in a bipolar mode, employing a PWM current control with current recirculation in the upper portion of the full-bridge output stages.

A first embodiment of the system according to the invention is depicted in FIG. 6. Two commercially available integrated circuits: L6234, produced by SGS-Microelectronics, are used as the power stage. Each of these integrated circuits contains a triple half-bridge (three half-bridge stages) controlled by digital inputs. Each half-bridge of each integrated device is coupled to an enable input (EN1, EN2, EN3) and to a command input (IN1, IN2, IN3). The enable input when set at the logic level "0" disables both DMOS power transistors of the half-bridge associated therewith. If the command input assumes a logic level "1" this turns on (if the corresponding enable signal is also at "1") the power transistor DMOS of the upper portion of the half-bridge. If the command input assumes a logic level "0" this turns on (if the corresponding enable signal is also at "1") the DMOS power transistor of the lower portion of the half-bridge.

FIG. 6 shows that the lower potential node of the three half-bridges having the A,B,C outputs, respectively, is coupled to ground through a first sensing resistor Rs1, while the lower potential node of the three half-bridges having the a,b,c outputs, respectively, is coupled to ground through a second sensing resistor Rs2. Each sensing resistor is coupled with a PWM current control circuit, comprising a voltage comparator and a ONE SHOT monostable circuit, which permits individually acting on the three phase windings of the motor. The current control system thus realized is of a Pulse Width Modulation (PWM) type with a constant TOFF and a slow current recirculation in the upper portion of the bridge.

In the following analysis a PWM current control with a constant TOFF is described in detail. However, the same considerations hold also for the case of PWM control with a constant frequency and the system of the invention is applicable in both cases.

The bipolar driving of a brushless motor with three independent phase windings as in one implementation has been described above. The phase rotation sequence of a brushless motor for a motor with three independent phase windings should be rewritten as follows:

| 1° step | 2° step | 3° step | 4° step | 5° step | 6° step |
|---------|---------|---------|---------|---------|---------|
| Aa + bB - | Aa + cC - | Bb + cC - | Bb + aA - | Cc + aA - | Cc + bB |

Taking for example the 1° step, where A and B are the exited phase windings, in the phase winding A flows a current from A to a, in the phase winding B flows a current from b to B, while no current is forced through the phase winding C.

The block SEQUENCER of the scheme of FIG. 6, generates the following signals:

| EN_A | EN_B | EN_C |
|------|------|------|
| InA  | InB  | InC  |
| Ina  | Inb  | Inc  | which program the turning on of the output stage, in a manner as to comply with the above noted sequence and synchronously with the position of the motor's rotor sensed by the ROTOR POSITION DETECTOR.

With reference to FIG. 6, the value of the current to be controlled is determined by the value of the control voltage Vctrl applied to the inverting inputs of the comparators COMP1 and COMP2. The two monostable circuits ONE1 and ONE2 define the duration of the interval in which the currents circulating in the enabled phase windings at that instant are forced in their recirculation phase through the gates: OR_A, OR_a, OR_B, OR_b, OR_C, OR_c.

The first step may be considered for an analysis that is valid also for all the other steps (switching phase). In the first step, when A and B are the exited windings, through the sensing resistor Rs2 flows the current of the winding A, while the current of the winding B flows through the resistor Rs1. Therefore during this switching phase, the current of winding A is controlled by the circuit CURRENT CONTROL 2 while the current of winding B is controlled by the circuit CURRENT CONTROL 1.

As far as the winding A is concerned, being the outputs of the monostable circuits ONE1 and ONE2 are initially set at the logic level "0", the logic level of the programming signals of the output stage is:

EN_A="1" (half-bridge enabled)

InA=INA="1"

Ina=INa="0"

The current flowing through the winding A is provided by enabling the turning on of the MOS transistors T1A a T4A. When the voltage on Rs2 produced by the current flowing in the motor's winding exceeds the control voltage Vctrl, the comparator COMP2 switches its output thereby triggering the monostable circuit ONE2 that switches its output to a logic level "1" for a determined interval of time. The output of the monostable circuit, being ORed with the Ina signal, forces the output of the gate OR_a (equivalent to the driving signal INa) to a logic level "1", thus turning off the MOS transistor T4A and turning on the MOS transistor T3A. In this way, the current through the winding A starts to decrease for the whole duration of its phase of slow recirculation through the upper portion of the bridge provided by the MOS transistors T1A and T3A. This situation remains unchanged until the output of the monostable circuit ONE2 returns to a logic level "0", thus resetting the preceding situation, wherein the current circulated in the phase winding A by the turning on of the MOS transistors T1A and T4A. In this way, the current starts to increment and when the voltage drop on Rs2 exceeds the control value Vctrl, the cycle is repeated.

At the same instant, as far as the phase winding B is concerned, the logic level of the programming signals of the output stage is the following:

EN_B="1"

InB=INB="0"

Inb=INb="1"

The current flowing through the winding A is provided by enabling the turning on of the MOS transistors T3B and T2B. When the voltage on Rs1 produced by the current flowing in the motor's winding exceeds the control voltage Vctrl, the comparator COMP1 switches its output triggering the monostable circuit ONE1 that switches its output to a logic level "1" for a determined interval of time. The output of the monostable circuit, being ORed with the InB signal, forces the output of the gate OR_B (equivalent to the driving signal INB) to a logic level "1", thus turning off the MOS transistor T2B and turning on the MOS transistor T1B. In this way, the current through the winding B starts to decrease for the whole duration of its phase of slow recirculation through the upper portion of the bridge provided by the MOS transistors T1B and T3B. This situation remains unchanged until the output of the monostable circuit ONE1 returns to a logic level "0", thus resetting the preceding situation, wherein the current circulated in the phase winding B by the turning on of the MOS transistors T3B and T2B. In this way, the current starts to increment and when the voltage drop on Rs1 exceeds the control value Vctrl, the cycle is repeated.

As an alternative to recirculating the current in the upper portion or branches of the bridge, the current may be recirculated in the lower portion or branches of the bridge. To achieve this, the current control circuit of the three motor's windings may be modified as shown in FIG. 7.

Figure 7:
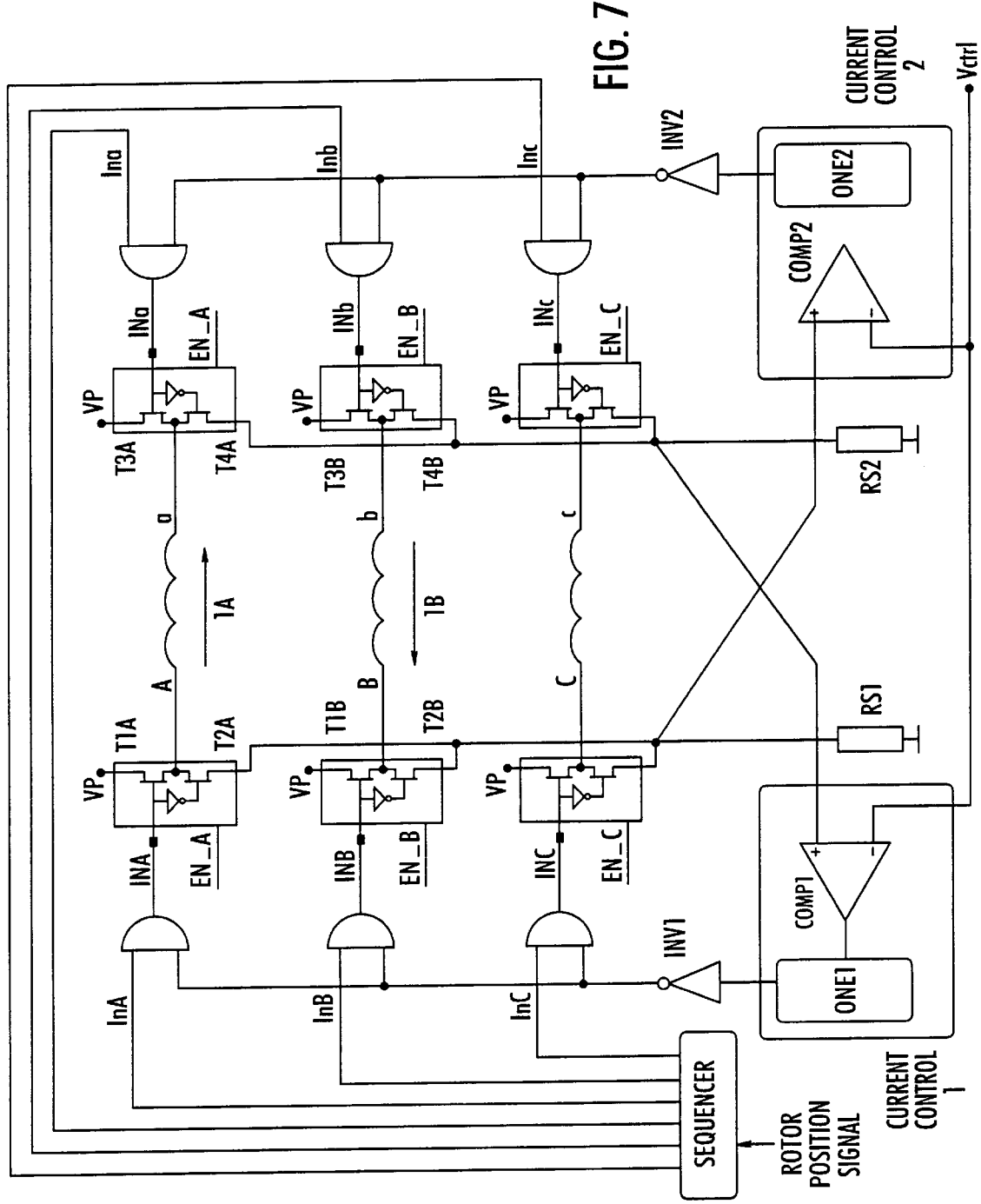
FIG. 7 is the same system of FIG. 6, but with current recirculation in the lower portion of the full-bridge output stages.

Differently from the circuit shown in FIG. 6, the alternative embodiment of FIG. 7 shows that to implement a PWM current control while arranging for a slow recirculation in the lower portion of the bridge configured output stage, the voltage drop on Rs1 is compared with the control voltage Vctrl by the comparator COMP2, while the voltage drop on Rs2 is compared with the control voltage Vctrl by the comparator COMP1.

Again, the first step or switching phase when A and B are exited windings may be taken as an example. As before, the current of the phase winding A flows through the sensing resistor Rs2, while the current of the phase winding B flows through the resistor Rs1. However, the current in the phase winding A is now controlled by the circuit CURRENT CONTROL 1, while the current in the phase winding B is controlled by the circuit CURRENT CONTROL 2.

As far as the phase winding A is concerned, being the outputs of the monostable circuits ONE1 and ONE2 are set initially at the logic level "0", the logic level of the programming signals of the output stage is:

EN_A="1" (half-bridge enabled)

InA=INA="1"

Ina=INa="0"

The current in the phase winding A in this case is supplied by the MOS transistors T1A and T4A.

The circuit CURRENT CONTROL 1 acts on the driving signals of the output stage in logic AND with the output signals of the SEQUENCER. More precisely when the voltage drop on the sensing resistor Rs2 exceeds the control voltage Vctrl, the comparator COMP1 switches and the output of the monostable circuit ONE1 goes to a logic level "1" for a predetermined time. This, through the inverter INV1 and the gates realizing a logic AND with the output signal InA of the SEQUENCER, forces to a logic level "0" the INA signal that drives the power stage. This enables the current recirculation in the lower portion of the bridge, turning on in this case the MOS transistors T2a and T4A.

For the phase winding B:

EN_B="1" (half-bridge enabled)

InB=INB="0"

Inb=INb="1"

Initially the current is fed to the motor through the MOS transistors T3B and T2B. When the voltage present on the terminals of the sensing resistor Rs1 exceeds the control voltage Vctrl, the comparator COMP2 triggers the monostable circuit ONE2 whose output goes to a logic level "1" for a predetermined interval of time. This, through the inverter INV2 and the gate that implement a logic AND with the output signal InB of the SEQUENCER, and forces to a logic level "0" the INb signal that drives the power stage. This enables current recirculation in the lower portion of the bridge by turning on, in this case, the MOS transistors T4B and T2B.

That which is claimed:

1. A method of controlling current in a pulse width modulation (PWM) mode for multi-phase resistance-inductance (R-L) electrical actuators with each phase winding being independently driven by a full-bridge stage comprising first and second half-bridge stages, each half-bridge stage including respective upper and lower power devices being controlled in phase opposition with each other, the method comprising the steps of:

sensing current flowing through a first phase winding on a first sensing resistor connected between lower potential nodes connected in common with first ones of the half-bridge stages of the full-bridge stages and a common supply node of the circuit;

sensing current flowing through a second phase winding on a second sensing resistor connected between the lower potential nodes connected in common with second ones of the half-bridge stages of the full-bridge stages and the common supply node of the circuit;

comparing signals present on the first sensing resistor and on the second sensing resistor with a same reference signal;

generating triggering signals for two monostable circuits, respectively, based upon the comparing; and driving each of the half-bridge stages through combinatory logic comprising an OR gate and combining the signal produced by a respective monostable circuit of the two monostable circuits and a driving signal produced by a sequencer and synchronizer system for phase switchings.

2. A method according to claim 1, wherein the combinatory logic comprises and AND gate combining the signal produced by the respective monostable circuit after an inversion.

3. A method of controlling current in a pulse width modulation (PMW) mode for multi-phase resistance-inductance (R-L) electrical actuators with each phase winding being independently driven by a full-bridge stage comprising first and second half-bridge stages, each half-bridge stage including respective upper and lower power devices being controlled in phase opposition with each other, the method comprising the steps of:

sensing current flowing through a first phase winding on a first sensing resistor connected between lower potential nodes connected in common with first ones of the half-bridge stages of the full-bridge stages and a common supply node of the circuit;

sensing current flowing through a second phase winding on a second sensing resistor connected between the lower potential nodes connected in common with second ones of the half-bridge stages of the full-bridge stages and the common supply node of the circuit;

driving each of the half-bridge stages based upon the sensing steps;

comparing signals present on the first sensing resistor and on the second sensing resistor with a same reference signal;

generating triggering signals for two monostable circuits, respectively, based upon the comparing steps; and driving each of the half-bridge stages through combinatory logic comprising an OR gate and combining the signal produced by a respective monostable circuit of the two monostable circuits and a driving signal produced by a sequencer and synchronizer system for phase switchings.

4. A method according to claim 3, wherein the combinatory logic comprises and AND gate combining the signal produced by the respective monostable circuit after an inversion.

5. A pulse width modulation (PWM) current control system for multi-phase winding resistance-inductance (R-L) electrical actuators, comprising:

a plurality of full-bridge stages each including first and second half-bridge stages for independently driving each phase winding, each half-bridge stage comprising upper and lower power devices controlled in phase opposition with each other;

a first sensing resistor connected between lower potential nodes connected in common with each other of first ones of the half-bridge stages and a common supply node of the circuit;

a second sensing resistor connected between the lower potential nodes connected in common with each other of second ones of the half-bridge stages and a common supply node of the circuit;

a sequencer and synchronizer system for producing driving logic signals for phase switchings; and a first and a second control circuit, each comprising:

a comparator for comparing a voltage on a respective sensing resistor with a common reference signal, a first and a second monostable circuit for generating a pulse of preestablished duration as a function of the output of the respective comparator, and combinatory logic comprising an OR gate and combining a logic signal produced by a respective monostable circuit with a logic signal produced by said sequencer and synchronizer system and producing a logic signal for driving a respective half-bridge stage.

6. A system according to claim 5, wherein said combinatory logic comprises an inverter, and an AND gate for combining the signal produced by the respective monostable circuit downstream from the inverter.

7. A system according to claim 5, wherein each of said half-bridge stages has a second input for a disabling/enabling the respective upper and lower power devices.

8. A pulse width modulation (PWM) current control system for multi-phase winding resistance-inductance (R-L) electrical actuators, comprising:

a plurality of full-bridge stages each including first and second half-bridge stages for independently driving each phase winding, each half-bridge stage comprising upper and lower power devices controlled in phase opposition with each other;

a first sensing resistor connected between lower potential nodes connected in common with each other of first ones of the half-bridge stages and a common supply node of the circuit;

a second sensing resistor connected between the lower potential nodes connected in common with each other of second ones of the half-bridge stages and a common supply node of the circuit; and first and second control circuits for controlling respective half-bridge stages based upon voltages on said first and second sensing resistors, wherein said first and second control circuits each comprises:

a comparator for comparing a voltage on a respective sensing resistor with a common reference signal;

a first a second monostable circuit for generating a pulse of preestablished duration as a function of the output of the respective comparator; and combinatory logic comprising an OR gate and for combining a logic signal produced by a respective monostable circuit with a logic signal produced by said sequencer and synchronizer system and producing a logic signal for driving a respective stage.

9. A system according to claim 8, wherein said combinatory logic comprises an inverter and an AND gate for combining the signal produced by the respective monostable circuit downstream from the inverter.

10. A system according to claim 8, wherein each of said half-bridge stages has a second input for a disabling/enabling the respective upper and lower power devices.

* * * * *

UNITED STATES PATENT AND TRADEMARK OFFICE
CERTIFICATE OF CORRECTION

PATENT NO. : 6,057,663  
DATED : May 2, 2000  
INVENTOR(S) : Galbiati et al

Page 1 of 2

It is certified that error appears in the above-identified patent and that said Letters Patent is hereby corrected as shown below:

On the title page:

Item [56] References Cited

Insert:

FOREIGN PATENT DOCUMENTS

| | | | |
|---|---|---|---|
| 0511392 A1 | 11/1992 | European Pat. Off. | H02P 6/02 |
| 0501398 A1 | 9/1992 | European Pat. Off. | H02P 6/02 |
| 4002158 A1 | 8/1991 | Germany | H02P 8/00 |

Column 7, line 26

Insert: "further" between "logic comprises"

Column 7, line 30

Delete: (PMW)   Insert: (PWM)

UNITED STATES PATENT AND TRADEMARK OFFICE
CERTIFICATE OF CORRECTION

PATENT NO. : 6,057,663
DATED : May 2, 2000
INVENTOR(S) : Galbiati et al

Page 2 of 2

It is certified that error appears in the above-identified patent and that said Letters Patent is hereby corrected as shown below:

Column 7, line 61     Insert: "further" between "logic comprises"

Column 8, line 27     Insert: "further" between "logic comprises"

Column 9, line 2     Insert: "further" between "logic comprises"

Signed and Sealed this

Twentieth Day of February, 2001

Attest:

NICHOLAS P. GODICI

Attesting Officer     Acting Director of the United States Patent and Trademark Office